United States Patent
Scherz (10) Patent No.: US 11,372,085 B2
(45) Date of Patent: Jun. 28, 2022

(54) RADAR APPARATUS AND METHOD FOR PRODUCING DIFFERENT DIRECTIONAL CHARACTERISTICS

(71) Applicant: Infineon Technologies AG, Neubiberg (DE)

(72) Inventor: Philipp Scherz, Linz (AT)

(73) Assignee: Infineon Technologies AG

( * ) Notice: Subject to any disclaimer, the term of this patent is extended or adjusted under 35 U.S.C. 154(b) by 440 days.

(21) Appl. No.: 16/524,563

(22) Filed: Jul. 29, 2019

(65) Prior Publication Data

US 2020/0041611 A1 Feb. 6, 2020

(30) Foreign Application Priority Data

Aug. 2, 2018 (DE) ........................ 102018118863.3

(51) Int. Cl.
| | | |
|---|---|---|
| *G01S 7/40* | (2006.01) | |
| *G01S 13/34* | (2006.01) | |
| *H01Q 25/00* | (2006.01) | |
| *H01Q 23/00* | (2006.01) | |
| *G01S 7/03* | (2006.01) | |
| *G01S 13/42* | (2006.01) | |

(52) U.S. Cl.
CPC .............. *G01S 7/4056* (2013.01); *G01S 7/03* (2013.01); *G01S 13/34* (2013.01); *G01S 13/345* (2013.01); *G01S 13/426* (2013.01); *H01Q 23/00* (2013.01); *H01Q 25/00* (2013.01)

(58) Field of Classification Search
CPC ...... G01S 7/4056; G01S 13/34; G01S 13/426; G01S 13/345; H01Q 23/00; H01Q 25/00
See application file for complete search history.

(56) References Cited

U.S. PATENT DOCUMENTS

| | | | |
|---|---|---|---|
| 8,730,095 B1 * | 5/2014 | Volman | ..................... G01S 3/48 342/153 |
| 8,922,422 B2 | 12/2014 | Klar et al. | |
| 9,190,717 B2 | 11/2015 | Schoeberl et al. | |
| 10,205,457 B1 * | 2/2019 | Josefsberg | .............. G01S 7/032 |

(Continued)

FOREIGN PATENT DOCUMENTS

| | | | |
|---|---|---|---|
| DE | 102008054624 A1 | 6/2010 | |
| DE | 102010001761 A1 | 8/2011 | |
| WO | WO-2011029643 A1 * | 3/2011 | ......... G01S 13/4454 |

*Primary Examiner* — Thomas M Hammond, III
(74) *Attorney, Agent, or Firm* — Design IP (57) ABSTRACT

A radar apparatus is provided having an antenna that has a frequency-dependent directional characteristic. The radar apparatus includes a transmitter circuit designed to generate a first frequency-modulated continuous wave (FMCW) frequency ramp having a first center frequency and at least one second FMCW frequency ramp having a second center frequency, which is different than the first center frequency. The transmitter circuit is configured to drive the antenna using the first FMCW frequency ramp to produce a first directional characteristic for the at least one antenna, and to drive the antenna using the at least one second FMCW frequency ramp to produce a second directional characteristic for the antenna, where the second directional characteristic is different from the first directional characteristic. It is thus possible to exploit an antenna squinting effect in order to increase an angular resolution.

20 Claims, 7 Drawing Sheets

(56) References Cited

U.S. PATENT DOCUMENTS

| | | | | |
|---|---|---|---|---|
| 2009/0303108 A1* | 12/2009 | Hilsebecher | ............ | G01S 7/352 |
| | | | | 342/157 |
| 2012/0169525 A1* | 7/2012 | Klar | ...................... | G01S 13/426 |
| | | | | 342/70 |
| 2013/0016001 A1* | 1/2013 | Schoeberl | ............. | G01S 13/931 |
| | | | | 342/129 |
| 2014/0035776 A1* | 2/2014 | Sochen | ................ | G01S 15/582 |
| | | | | 342/107 |
| 2014/0225766 A1* | 8/2014 | Binzer | ...................... | G01S 7/02 |
| | | | | 342/147 |
| 2017/0131392 A1* | 5/2017 | Schoor | .................... | G01S 13/34 |
| 2017/0131394 A1* | 5/2017 | Roger | .................. | G01S 13/343 |
| 2019/0326684 A1* | 10/2019 | Achour | .................. | H01Q 13/22 |

* cited by examiner

RADAR APPARATUS AND METHOD FOR PRODUCING DIFFERENT DIRECTIONAL CHARACTERISTICS

FIELD

The present disclosure relates generally to radar applications and in particular to frequency-modulated continuous wave radar systems for motor vehicles.

BACKGROUND

Frequency-modulated continuous wave radar systems are also called FMCW radar systems. In this case, for example linear frequency modulation of a transmitted signal results in the absolute value of the frequency interval Δf between transmitted signal and received signal at any time being a measure of the propagation time (Δt) and hence of the range. The signal processing in the case of FMCW radar systems essentially comprises the measurement of the difference frequency Δf obtained by mixing the echo signal and the present transmission frequency.

The angular resolution of such FMCW radar systems is critically dependent on the size of the antenna aperture. In the case of conventional automobile radar sensors, this can be increased using a larger number of physical RF channels (RF=radio-frequency, RF channel comprises transmitter and/or receiver) that are combined using a multiple-in-multiple-out (MIMO) method to produce a virtual antenna array. A larger number of physical RF channels gives rise to higher costs for the required hardware, however, and, specifically in the automotive sector, is a disadvantage on account of large numbers of parts.

There is therefore a need to increase the attainable angular resolution of FMCW radar sensors for a constant number of RF channels.

SUMMARY

This need is met by the apparatuses and methods according to the independent claims Developments that are advantageous under some circumstances are the subject of the dependent claims.

According to a first aspect of the present disclosure, a radar apparatus is provided. The radar apparatus includes at least one antenna having a frequency-dependent directional characteristic. The radar apparatus further includes a transmitter circuit designed to generate a first frequency-modulated continuous wave (FMCW) frequency ramp having a first center frequency and at least one second FMCW frequency ramp having a second center frequency, which is different than the first center frequency. The transmitter circuit drives the at least one antenna using the first FMCW frequency ramp and using the second FMCW frequency ramp in order to use the first FMCW frequency ramp to produce a first directional characteristic and to use the second FMCW frequency ramp to produce a different, second directional characteristic for the at least one antenna.

The actuation of the at least one antenna using FMCW frequency ramps having different center frequencies, which is also referred to as analog beamforming below, allows the angular resolution of the radar apparatus to be achieved for a constant number of RF channels. What is known as the "antenna squinting effect" is exploited in order to control the focusing direction of the antenna. The center frequency of the FMCW frequency ramp can be taken as a basis for manipulating the desired focusing direction.

According to some exemplary embodiments, the at least one antenna of the radar apparatus has a first radiating angle when driven using the first frequency ramp and a second radiating angle when driven using the second frequency ramp. Depending on the design and/or arrangement of the at least one antenna, these may be different radiating angles in the azimuth direction and/or in the elevation direction, for example.

According to some exemplary embodiments, the at least one antenna or its physical dimensions is/are designed for a prescribed nominal frequency. The first center frequency may now be lower than the nominal frequency, for example, whereas the second center frequency may be higher than the nominal frequency. As a result, the respective radiating angle, starting from a reference radiating angle at nominal frequency, swings in different directions at the different center frequencies. By way of example, the first radiating angle may be larger in comparison with the reference radiating angle at the first center frequency, whereas the second radiating angle may be smaller in comparison with the reference radiating angle at the second center frequency. The opposite is—depending on the antenna design and/or the chosen frequencies—naturally likewise possible.

According to some exemplary embodiments, the transmitter circuit is designed to drive the at least one antenna using the first and the second FMCW frequency ramp in different time intervals. As a result, different directional characteristics or radiating angles of the at least one antenna can be obtained in the different (e.g. successive) time intervals, and the angular resolution of the radar apparatus can be increased overall.

According to some exemplary embodiments, the transmitter circuit is designed to drive the at least one antenna using a plurality of successive first FMCW frequency ramps having the first center frequency in a first time interval and to drive it using a plurality of successive second FMCW frequency ramps having the second center frequency in a second time interval, which does not overlap the first time interval. Therefore, suitable signal processing (e.g. Fourier transformation) can be used to obtain a first "range Doppler map" based on the first directional characteristic in the first time interval and a second range Doppler map based on the second directional characteristic in the second time interval.

According to some exemplary embodiments, the directional characteristic of the at least one antenna in the elevation direction is frequency dependent. Therefore, the different FMCW frequency ramps can be used to "look" in different elevation directions on the basis of the squinting effect.

According to some exemplary embodiments, the at least one antenna is in the form of a panel antenna that, as seen from one connection, has a plurality of patch elements connected in series. The individual patch elements can have varying physical dimensions in this case. This allows focusing of the directional characteristic to be achieved.

According to some exemplary embodiments, the radar apparatus has an antenna array having a plurality of antennas, wherein the antenna array has a frequency-dependent directional characteristic. The antenna array can be put to good use both in the transmission direction and in the reception direction, for example in order to improve a spatial resolution of the radar apparatus. The at least one antenna may be part of the antenna array or may itself be in the form of an antenna array in some exemplary embodiments.

According to some exemplary embodiments, the transmitter circuit is designed to drive a first antenna of the antenna array using the first FMCW frequency ramp in a first time interval and using the second FMCW frequency ramp in a second time interval, and to drive a second antenna of the antenna array using the first FMCW frequency ramp in a third time interval and using the second FMCW frequency ramp in a fourth time interval. Therefore, the first and second antennas of the antenna array can be driven in succession as transmitting antennas having changing radiating angles.

According to some exemplary embodiments, the radar apparatus further includes a receiving antenna array having a plurality of receiving antennas, and a receiver circuit designed to vary a reception directional characteristic of the receiving antenna array by adjusting phase offsets between the receiving antennas or the corresponding received signals. The at least one antenna can act as part of the receiving antenna array in some exemplary embodiments. In the reception direction, the reception directional characteristic can thus be varied by means of beamforming. In this case, the reception directional characteristic of the receiving antenna array may be variable in the azimuth direction. Preferably but not necessarily, the receiver circuit is in the form of a digital beamforming circuit.

According to a further aspect of the present disclosure, a radar apparatus is provided for a motor vehicle. It includes at least one transmitting antenna having a transmission directional characteristic that is frequency-dependent in a first direction. The radar apparatus additionally includes a transmitter circuit designed to generate a first FMCW frequency ramp having a first center frequency and at least one second FMCW frequency ramp having a second center frequency, which is different than the first center frequency, and to drive the at least one transmitting antenna using the first FMCW frequency ramp and using the second FMCW frequency ramp in order to use the first FMCW frequency ramp to produce a first transmission directional characteristic and to use the second FMCW frequency ramp to produce a different, second transmission directional characteristic for the at least one transmitting antenna. The radar apparatus further includes a receiving antenna array having a plurality of receiving antennas, wherein a reception directional characteristic of the receiving antenna array is variable in a second direction. Additionally, the radar apparatus includes a digital beamforming circuit designed to vary the reception directional characteristic of the receiving antenna array by adjusting phase offsets between the individual receiving antennas or between the corresponding received signals.

According to some exemplary embodiments, the at least one transmitting antenna has a first radiating angle in the elevation direction when driven using the first frequency ramp and a different, second radiating angle in the elevation direction when driven using the second frequency ramp. By contrast, the reception directional characteristic of the receiving antenna array is adjustable in the azimuth direction. Therefore, an increased angular resolution can be achieved both in the elevation direction and in the azimuth direction.

According to a further aspect of the present disclosure, there is provision for a method for producing different directional characteristics. The method includes producing a first FMCW frequency ramp having a first center frequency and at least one second FMCW frequency ramp having a second center frequency, which is different than the first center frequency, and driving at least one antenna, which has a frequency-dependent directional characteristic, using the first FMCW frequency ramp and using the second FMCW frequency ramp in order to use the first FMCW frequency ramp to produce a first directional characteristic and to use the second FMCW frequency ramp to produce a different, second directional characteristic for the at least one antenna. Thus, an increased angular resolution can be achieved.

According to some exemplary embodiments, the at least one antenna radiates at a positive radiating angle in relation to a reference radiating angle when driven using the first FMCW frequency ramp and the at least one antenna radiates at a negative radiating angle in relation to the reference radiating angle when driven using the second FMCW frequency ramp.

According to some exemplary embodiments, the method further includes receiving a first reflection signal for the first FMCW frequency ramp using a receiving antenna array that includes a plurality of receiving antennas, receiving a second reflection signal for the second FMCW frequency ramp using the receiving antenna array and ascertaining first and second ranges to objects based on the first and second reflection signals.

According to some exemplary embodiments, the reception directional characteristic of the receiving antenna array is varied by adjusting phase offsets between the receiving antennas or their respective received signals.

According to some exemplary embodiments, the receiving of the first reflection signal is taken as a basis for producing first digital values. The receiving of the second reflection signal is taken as a basis for producing second digital values. A first Fourier transformation is performed based on the first digital values and a second Fourier transformation is performed based on the second digital values. Range/speed information is produced based on results of the first and second Fourier transformations.

The aspects described herein can achieve the object above with a combination of digital and analog beamforming. As a result, an angular resolution can be increased for constant hardware costs. A susceptibility of the radar apparatus to error as a result of other road users (interference) can be reduced on the basis of the integration of analog beamforming. A combination with already existing methods is a simple possibility, e.g. an azimuth angle measurement by means of digital beamforming and an elevation angle measurement by means of the analog beamforming presented here, by exploiting the squinting effect.

BRIEF DESCRIPTION OF THE DRAWINGS

A few examples of apparatuses and/or methods are explained more specifically merely by way of example below with reference to the accompanying figures, in which.

DETAILED DESCRIPTION

Various examples will now be described in more detail with reference to the accompanying figures, which depict a few examples. The thicknesses of lines, layers and/or areas may be exaggerated in the figures for clarification.

While further examples are suitable for various modifications and alternative forms, accordingly a few particular examples thereof are shown in the figures and are described thoroughly below. However, this detailed description does not restrict further examples to the particular forms described. Further examples can cover all modifications, counterparts and alternatives that fall within the scope of the disclosure. Throughout the description of the figures, identical or similar reference signs refer to identical or similar elements that, when compared with one another, may be implemented identically or in modified form while providing the same or a similar function.

It goes without saying that if one element is designated as "connected" or "coupled" to another element, the elements can be connected or coupled directly or via one or more intermediate elements. If two elements A and B are combined using an "or", this should be understood such that all possible combinations are disclosed, i.e. only A, only B, and A and B, unless explicitly or implicitly defined otherwise. An alternative wording for the same combinations is "at least one from A and B" or "A and/or B". The same applies, mutatis mutandis, to combinations of more than two elements.

The terminology used here for describing specific examples is not intended to be limiting for further examples. If the singular form, for example "a, an" and "the", is used and the use of only a single element is defined neither explicitly nor implicitly as obligatory, further examples can also use plural elements in order to implement the same function. If a function is described below as being implemented using multiple elements, further examples can implement the same function using a single element or a single processing entity. Furthermore, it goes without saying that the terms "comprises", "comprising", "has" and/or "having" in their usage indicate with greater precision the presence of specified features, integers, steps, operations, processes, elements, components and/or a group thereof, but do not exclude the presence or the addition of one or more other features, integers, steps, operations, processes, elements, components and/or a group thereof.

Unless defined otherwise, all terms (including technical and scientific terms) are used here in their customary meaning in the field with which examples are associated.

The further development of frequency-modulated continuous wave (FMCW) radar transceivers toward larger RF bandwidths and the possibility of generating complex and flexible frequency ramp scenarios allows the integration of frequency scanning beamforming into an FMCW-MIMO radar. It is proposed that the "antenna squinting effect" be exploited in order to control the focusing direction of the antenna. The center frequency of the frequency ramp can be taken as a basis for manipulating the desired focusing direction. In the case of automobile radar sensors, the instantaneous limiting, owing to the small number of physical RF channels, is rather the angular resolution (defined by antenna aperture) than the range resolution (defined by RF bandwidth). In the case of modern radar transceivers having several GHz of modulation bandwidth, the available range resolution can be changed into angular resolution in a "trade-off", for example.

Figure 1:
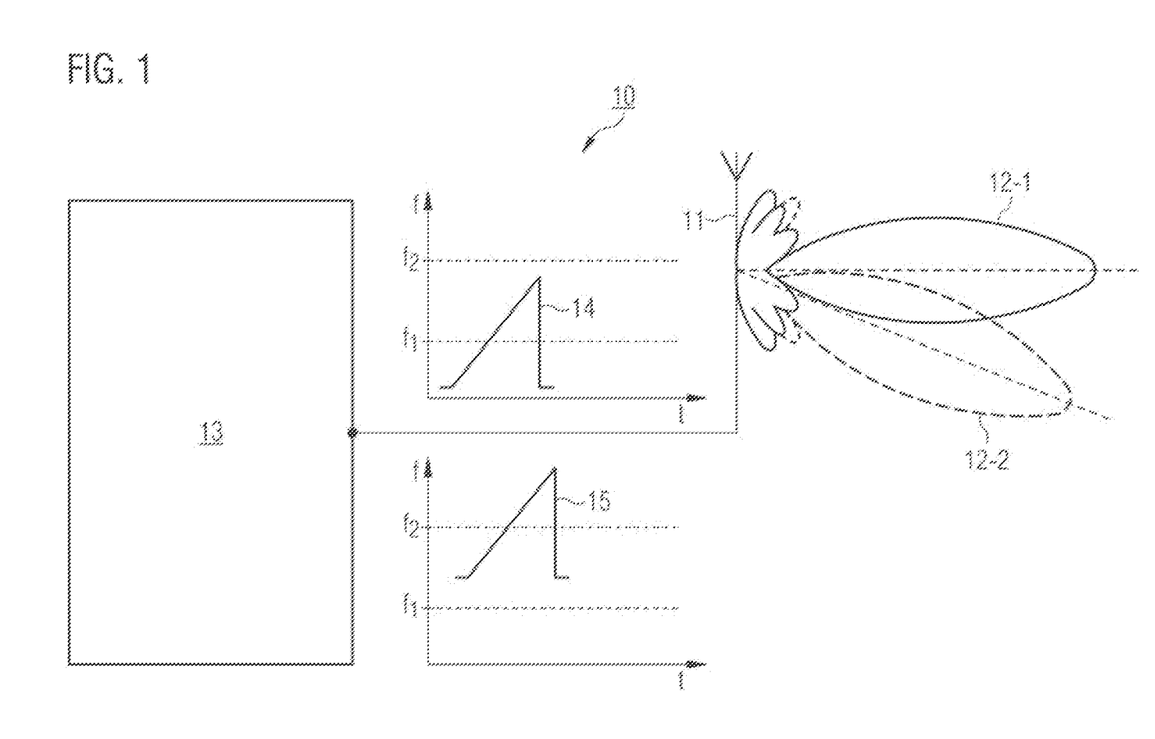
FIG. 1 shows a block diagram of a radar apparatus according to one exemplary embodiment.

In this regard, FIG. 1 shows a schematic block diagram of a radar apparatus 10 according to one exemplary embodiment of the present disclosure.

The radar apparatus 10 comprises an antenna 11 having a frequency-dependent directional characteristic 12 and is designed to produce an antenna squinting effect. The radar apparatus 10 further comprises a transmitter circuit 13 designed to generate a first FMCW frequency ramp 14 having a first center frequency $f_1$ and at least one second FMCW frequency ramp 15 having a second center frequency $f_2$, which is different than the first center frequency $f_1$, that is to say $f_1 \neq f_2$. The transmitter circuit 13 drives the antenna 11 using the first FMCW frequency ramp and using the second FMCW frequency ramp in order to use the first FMCW frequency ramp 14 to produce a first directional characteristic 12-1 and to use the second FMCW frequency ramp 15 to produce a different, second directional characteristic 12-2 for the at least one antenna 11.

In the case of linear frequency ramps, the center frequency of an FMCW frequency ramp can be understood to mean for example the middle frequency between the lowest $f_{low}$ and the highest $f_{high}$ frequency of the FMCW frequency ramp, that is to say e.g. $(f_{low}+f_{high})/2$.

The radar apparatus 10 can be a radar transmitter or radar transceiver for automobile applications. Accordingly, the radar apparatus 10 can be used for example as long range radar (LRR), mid range radar (MRR), corner or surround radar in a motor vehicle. Typical frequencies for such applications are currently in the area around 24 GHz (K band), 76 GHz or 96 GHz (W band). Since the antenna 11 has its physical dimensions adapted for a nominal frequency in one of these frequency bands, the different center frequencies $f_1$ and $f_2$ of the FMCW frequency ramps 14, 15 are preferably likewise in the selected frequency band, said center frequencies now being different than one another. This leads to the first FMCW frequency ramp 14 being spectrally shifted in comparison with the second FMCW frequency ramp 15. It is thus possible for the "antenna squinting effect" to be exploited in order to control the antenna diagram or the focusing direction of the antenna 11. The extent of the antenna squinting effect is dependent on the difference between the center frequencies $f_1$ and $f_2$, inter alia, in this case.

Figure 2:
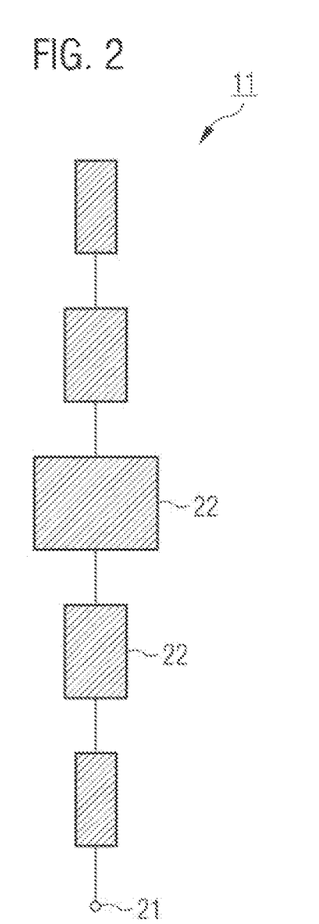
FIG. 2 shows an example of an antenna for the radar apparatus according to FIG. 1.

A possible antenna 11 for motor vehicle radar applications is a planar panel antenna, for example. However, a person skilled in the art will be familiar with other antenna designs also being able to be used. A schematic depiction of a possible panel antenna 11 is shown in FIG. 2.

The planar panel antenna 11 has a signal connection 21, as seen from which a plurality of patch elements 22 are connected in series as radiating areas. In the depicted exemplary embodiment, the individual patch elements 22 have varying geometric dimensions, which affects focusing of the radiating characteristic. The patch elements 22 connected in series can be regarded as a hardwired antenna array. A phase shift between the individual patch elements 22 is dependent on the physical distance thereof from one another and the frequency used. For a prescribed physical distance between the patch elements 22, the main radiating angle of the antenna 11 changes with the frequency used. The focusing is also frequency dependent. Different frequencies thus render different radiating angles and/or focusings realizable. In principle, this naturally also applies for other antenna designs that—similarly to the depicted example—act as an antenna array.

If the panel antenna 11 is mounted horizontally, its radiating angle will change in the azimuth direction in the case of FMCW frequency ramps having different center frequencies. If the panel antenna 11 is mounted vertically, then its radiating angle changes in the elevation direction in the case of FMCW frequency ramps having different center frequencies. Both are fundamentally possible and dependent on the advised application. We will look at vertically mounted antennas 11 below, the radiating angle of which is varied in the elevation direction by the proposed analog beamforming concept.

Figure 3:
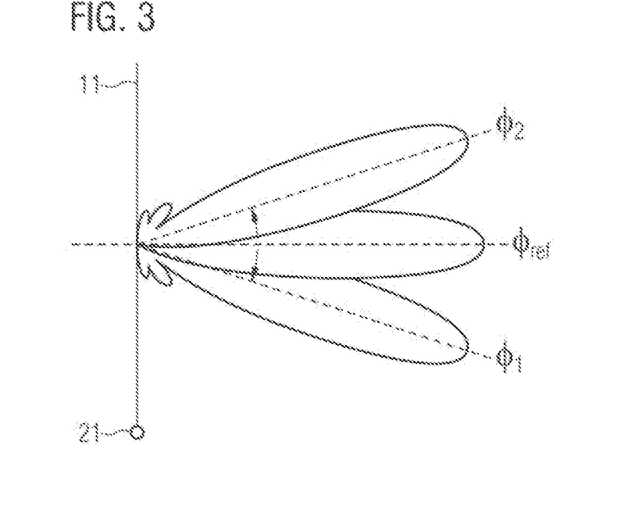
FIG. 3 shows different antenna directional characteristics obtained by means of FMCW frequency ramps having different center frequencies.

If the first center frequency $f_1$ is now lower than the nominal frequency, for example, the corresponding radiating angle of the antenna 11, starting from a reference radiating angle at nominal frequency, swings further downward. If the second center frequency $f_2$ is higher than the nominal frequency, on the other hand, the corresponding radiating angle of the antenna 11, starting from the reference radiating angle, swings further upward. This is shown schematically in the side view of FIG. 3, in which $\phi_{ref}$ denotes the reference radiating angle at nominal frequency, $\phi_1$ denotes the radiating angle at the first center frequency $f_1$ and $\phi_2$ denotes the radiating angle at the second center frequency $f_2$.

Figure 4:
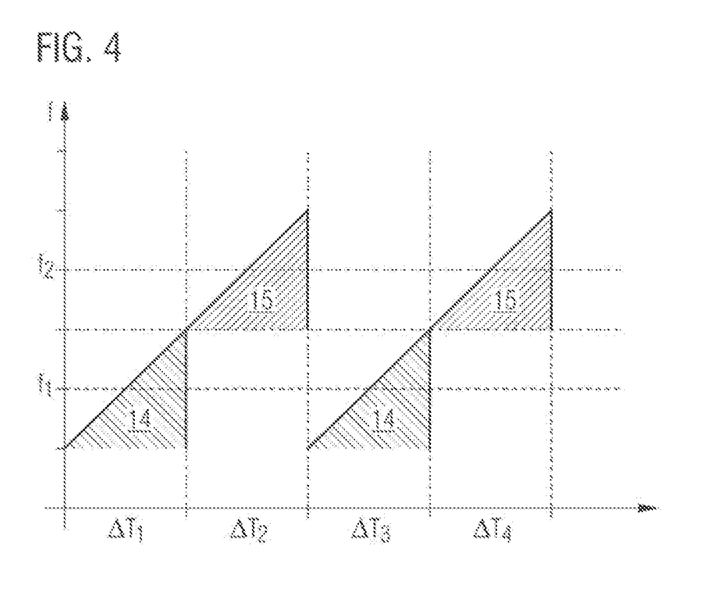
FIG. 4 shows actuation of at least one antenna using time-division multiplexing.

One way of driving the antenna 11 using the first and second FMCW frequency ramps 14, 15 is a time-division multiplexing method. The transmitter circuit 13 may thus be designed to drive the antenna 11 using the first and second FMCW frequency ramps 14, 15 in successive and non-overlapping time intervals. In this regard, an example is depicted in FIG. 4.

In this case, the transmitter circuit 13 is designed in exemplary fashion to drive the antenna 11 using the first FMCW frequency ramp 14 having the first center frequency $f_1$ in a first time interval $\Delta T_1$ and to drive it using the second FMCW frequency ramp 15 having the second center frequency $f_2$ in a second time interval $\Delta T_2$, which does not overlap the first time interval $\Delta T_1$. In a subsequent third time interval $\Delta T_3$, the antenna 11 is in turn driven using the first FMCW frequency ramp 14 having the first center frequency $f_1$, in order to be driven using the second FMCW frequency ramp 15 having the second center frequency $f_2$ in a subsequent fourth time interval $\Delta T_4$. A person skilled in the art will immediately see that the time intervals and/or the FMCW frequency ramps may also be of a different type. By way of example, it is possible to use more than two FMCW frequency ramps having different center frequencies. When there are more than two FMCW frequency ramps having different center frequencies, the angular resolution or accuracy of the control of a radiating angle can be increased further still. In FIG. 4, the respective frequency ramps associated with the time intervals are driven such that the end frequency of one ramp seamlessly joins the starting frequency of the next ramp in the subsequent time interval. In other exemplary embodiments, however, the end frequency of one ramp and the starting frequency of a subsequent ramp may be at a particular distance from one another. In this case, the end frequency of the preceding ramp may be lower than the starting frequency of the directly following ramp. However, it is also possible for the end frequency of the preceding ramp to be higher than the starting frequency of the directly following ramp, so that there is a certain overlap in the frequencies. Further, it should be noted that the embodiment in FIG. 4 has linear frequency ramps having a ramp gradient. Further, it may be possible for a frequency ramp to be formed by multiple linear sections, each linear section having a different ramp gradient. Similarly, in other embodiments, there may be provision for nonlinear frequency ramps to be used.

Separate range Doppler maps can be created for each of the FMCW frequency ramps 14, 15 in a manner known per se. In particular in order to obtain the speed or Doppler information, the antenna 11 can be repeatedly driven using a plurality (series) of successive first FMCW frequency ramps 14 having the first center frequency f1 in a first time interval. In a second time interval, which does not overlap the first time interval, the antenna 11 can be repeatedly driven using a plurality (series) of successive second FMCW frequency ramps 15 having the second center frequency f2. The number of successive FMCW frequency ramps having the same center frequency in a series can be chosen on the basis of the application, e.g. 64, 128 or more. For the purpose of further processing, the signals reflected back are down-converted using appropriate LO signals. That is to say that the signals reflected back for the first transmitted FMCW frequency ramps 14 are mixed with a LO signal that corresponds to the first FMCW frequency ramps 14, i.e. has a center frequency of $f_1$. Similarly, the signals reflected back for the second transmitted FMCW frequency ramps 15 are mixed with a LO signal that corresponds to the second FMCW frequency ramps 15, i.e. has a center frequency of $f_2$.

After reception and down-conversion of the reflected signals of the transmitted FMCW frequency ramps 14 having the first center frequency $f_1$ using the applicable LO signal, the IF (intermediate frequency) signals associated with the frequency ramps 14 are digitized and subjected to a first digital Fourier transformation (e.g. a first range fast Fourier transformation). Similarly, after reception and down-conversion of the reflected signals of the transmitted FMCW frequency ramps 15 having the second center frequency $f_2$, the IF signals associated with the frequency ramps 15 are digitized and subjected to a second digital Fourier transformation (e.g. a second range fast Fourier transformation). After the first or second range fast Fourier transformation, a further first or second Doppler fast Fourier transformation can follow. Thus, for example a fast Fourier transformation associated with the first time interval can be used to obtain what is known as a range Doppler map based on the first directional characteristic 12-1 and a fast Fourier transformation associated with the second time interval can be used to obtain a second range Doppler map based on the second directional characteristic 12-2. To produce the respective range Doppler maps, it is therefore possible, as described above, for signals based on the first FMCW frequency ramps 14 to be processed together and for signals based on the second FMCW frequency ramps 15 likewise to be processed together. In this exemplary embodiment, the Fourier transformation therefore merely covers signal points that are based on frequency ramps of the same type, i.e. frequency ramps having the same center frequency.

For each center frequency or the resultant radiating angle, it is thus possible for a separate range Doppler map to be ascertained. For each radiating angle, it is therefore possible for information concerning the distance and speed of the objects that are at this angle to be obtained. The selection and configuration of a suitable number of respective different center frequencies further allows an angular resolution to be adjusted without altering hardware components. A reliability of motor vehicle radar systems can further be significantly improved.

Instead of just one antenna 11, it is also possible for multiple antennas 11 to be connected to the transmitter circuit 13 in some exemplary embodiments. Looking at FIG. 4, in exemplary embodiments of this kind the transmitter circuit 13 may be designed to drive a first antenna 11-1 of the antenna array using the first FMCW frequency ramp 14 in a first time interval $\Delta T_1$ and using the second FMCW frequency ramp 15 in a second time interval $\Delta T_2$, and to drive another, second antenna 11-2 of the antenna array using the first FMCW frequency ramp 14 in a third time interval $\Delta T_3$ and using the second FMCW frequency ramp 15 in a fourth time interval $\Delta T_4$. In this case, the at least two (transmitting)

antennas 11-1 and 11-2 can additionally be used to obtain transmission diversity, and hence an improved signal-to-noise ratio.

Figure 5:
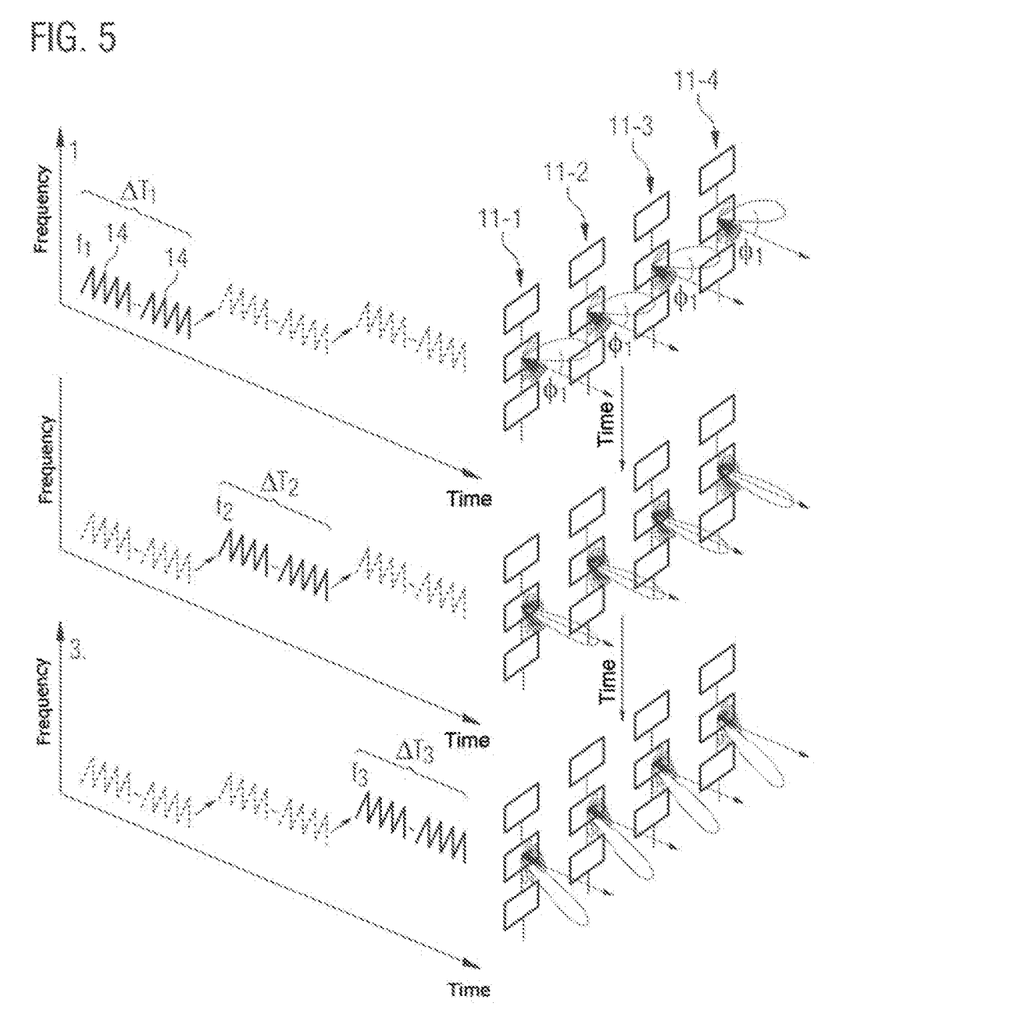
FIG. 5 shows actuation of multiple antennas using time-division multiplexing.

Another way of using multiple antennas is depicted schematically in FIG. 5. This shows four transmitting antennas 11-1, 11-2, 11-3 and 11-4 by way of example in the form of the panel antennas already discussed above.

In a first time interval $\Delta T_1$, all four antennas 11-1, 11-2, 11-3 and 11-4 are driven in parallel using a plurality of successive first FMCW frequency ramps 14 having the first center frequency $f_1$. This results in a first radiating angle $\phi_1$ for the four antennas 11-1, 11-2, 11-3 and 11-4. In a subsequent second time interval $\Delta T_2$, the four antennas 11-1, 11-2, 11-3 and 11-4 are driven in parallel using a plurality of successive second FMCW frequency ramps 15 having the second center frequency $f_2 \neq f_1$. This results in a second radiating angle $\phi_2 \neq \phi_1$ for the four antennas 11-1, 11-2, 11-3 and 11-4. In a subsequent third time interval $\Delta T_3$, the four antennas 11-1, 11-2, 11-3 and 11-4 are driven in parallel using a plurality of successive third FMCW frequency ramps having a third center frequency $f_3 \neq f_{1,2}$. This results in a third radiating angle $\phi_3 \neq \phi_{1,2}$ for the four antennas 11-1, 11-2, 11-3 and 11-4.

Exemplary embodiments are conceivable in which all antennas are linked to a common physical radar channel that can (e.g. successively) produce different FMCW frequency ramps having different center frequencies. On the other hand, different antennas may also be linked to different physical radar channels, each radar channel producing a separate FMCW frequency ramp having a respective center frequency.

In order to calculate an aforementioned range Doppler map, a receiver circuit is naturally also required. In the simplest case, there is provision for a receiving antenna in order to obtain range Doppler information for each of the different radiating angles $\phi_1$, $\phi_2$, $\phi_3$ in the elevation direction. However, it is entirely usual to use a receiving antenna array having a plurality of receiving antennas. Thus, beamforming mechanisms can be used to receive reflections from different (e.g. azimuth) directions. Together with the different radiating angles in the elevation direction, a multidimensional range Doppler map is then obtained.

Figure 6:
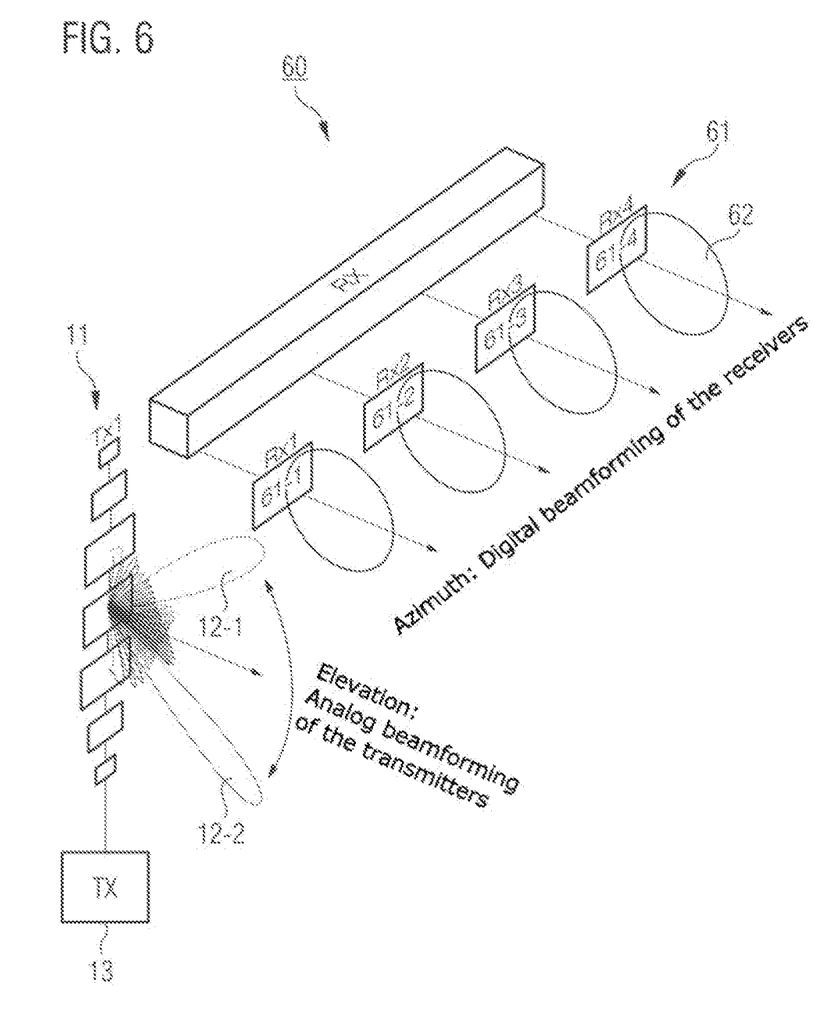
FIG. 6 shows an example of a radar transceiver.

An example of a radar transceiver 60 according to one exemplary embodiment is shown in FIG. 6.

FIG. 6 shows a radar apparatus 60 having (at least) a transmitting antenna 11 having a transmission directional characteristic that is frequency-dependent in a first direction. A transmitter circuit 13 is designed to generate a first FMCW frequency ramp 14 having a first center frequency $\phi_1$, $\phi_2$, $\phi_3$ and to generate at least one second FMCW frequency ramp 15 having a second center frequency $f_2$, which is different than the first center frequency $f_1$, and to drive the transmitting antenna 11 using the first FMCW frequency ramp and using the second FMCW frequency ramp in order to use the first FMCW frequency ramp to produce a first transmission directional characteristic 12-1 and to use the second FMCW frequency ramp to produce a different, second transmission directional characteristic 12-2 for the transmitting antenna 11. The radar apparatus 60 further comprises a receiving antenna array 61 having a plurality of receiving antennas 61-1, 61-2, 61-3 and 61-4, wherein a reception directional characteristic 62 of the receiving antenna array 61 is variable in a second direction. A digital beamforming circuit 63 is designed to vary the reception directional characteristic 62 of the receiving antenna array 61 by adjusting or varying phase offsets between received signals of the receiving antennas 61-1, 61-2, 61-3 and 61-4.

In FIG. 6, the first direction, in exemplary fashion, is the elevation direction and the second direction is the azimuth direction. Such a configuration could be used in a side-looking radar (SLR) for automatic parking and unparking, for example. The transmitting antenna 11 thus has a first radiating angle in a first elevation direction when driven using the first frequency ramp 14 and a different, second radiating angle in a second elevation direction when driven using the second frequency ramp 15. The reception directional characteristic 62 of the receiving antenna array 61 is adjustable in the azimuth direction.

Assuming a number of adjustable azimuth angles that are different as a result of digital beamforming to be N and a number of elevation angles that are adjustable as a result of different center frequencies to be M, mixing the transmitted and received signals would result in N×M measurements having multiple measured values (analog-to-digital converted samples) each. By evaluating successive FMCW frequency ramps for each (n, m) pair, a range Doppler map can be produced and accordingly evaluated for each pair (n, m). This allows the speed and range of objects to be detected and classified in relation to their spatial orientation both in azimuth and in elevation.

Figure 7:
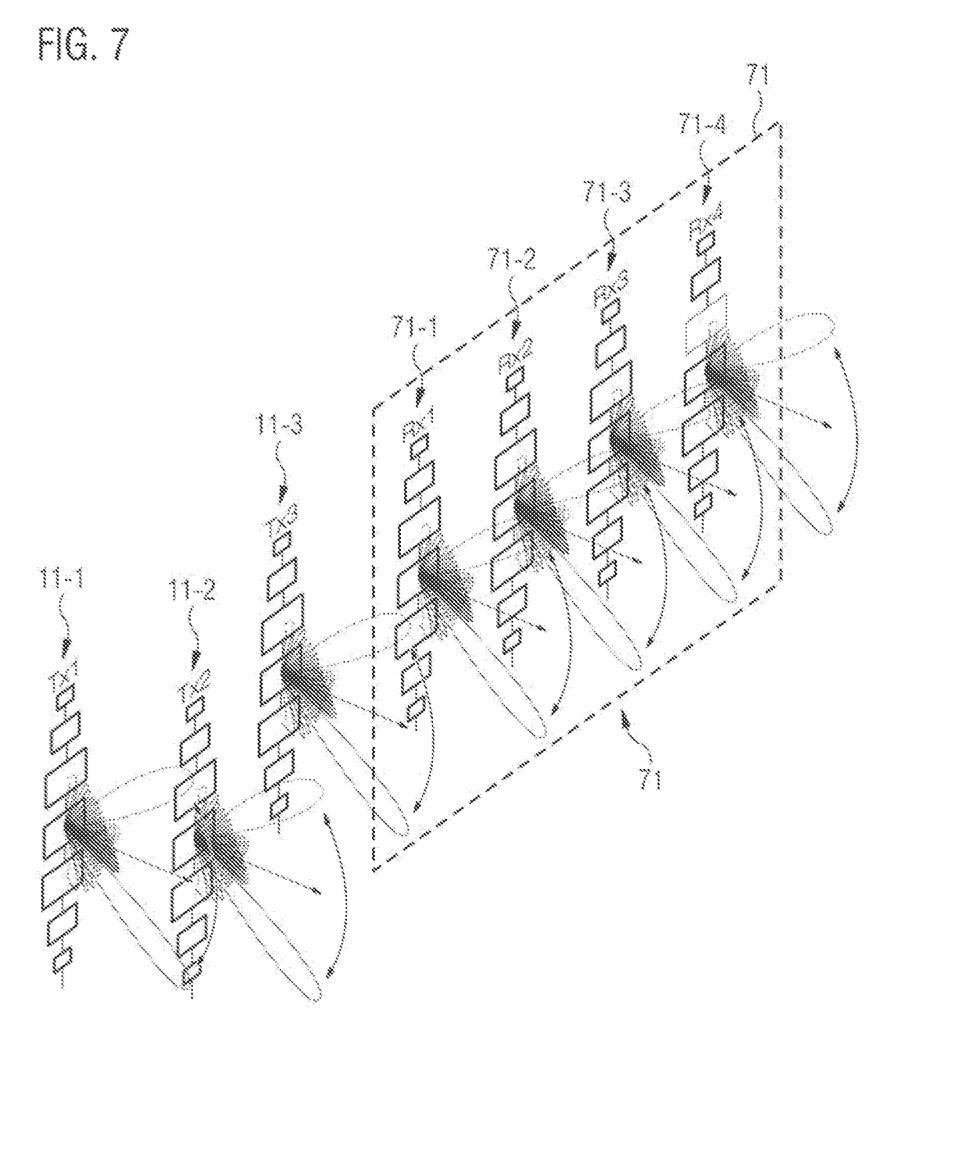
FIG. 7 shows an exemplary embodiment that could be used for a long range radar (LRR)

FIG. 7 shows a further exemplary embodiment that could be used for a long range radar (LRR), for example. For LRR, it may be advantageous to have not only a long measurement range but also a good azimuth angular resolution and an elevation measurement capability. These requirements can be met using an approach as shown in FIG. 7.

In this case, three transmitting antennas 11-1, 11-2 and 11-3, each having a transmission directional characteristic that is frequency-dependent in the elevation direction, are shown in exemplary fashion. The transmitting antennas 11-1, 11-2 and 11-3 can be supplied alternately or in parallel with FMCW frequency ramps having different ramp center frequencies in order to use the FMCW frequency ramps that differ on the basis of frequency to produce respective different directional characteristics in the elevation direction. The transmitting antennas 11-1, 11-2 and 11-3 may to this end be linked to different physical radar channels, each radar channel producing a separate FMCW frequency ramp having a respective center frequency. There is provision for a receiving antenna array 71 having a plurality of receiving antennas 71-1, 71-2, 71-3 and 71-4, the reception directional characteristic 72 of said receiving antenna array being variable both in the azimuth direction and in the elevation direction. In this case, the reception directional characteristic of the receiving antenna array 71 can be varied in the azimuth direction for example by means of digital beamforming (phase offset). In the elevation direction, the reception directional characteristic can be varied by using the FMCW frequency ramps having the different ramp center frequencies.

A radar having an antenna arrangement similar to FIG. 7 combines analog and digital beamforming in the elevation direction. In the azimuth direction, a high angular resolution can be achieved by means of the MIMO principle simply by means of digital beamforming.

Figure 8:
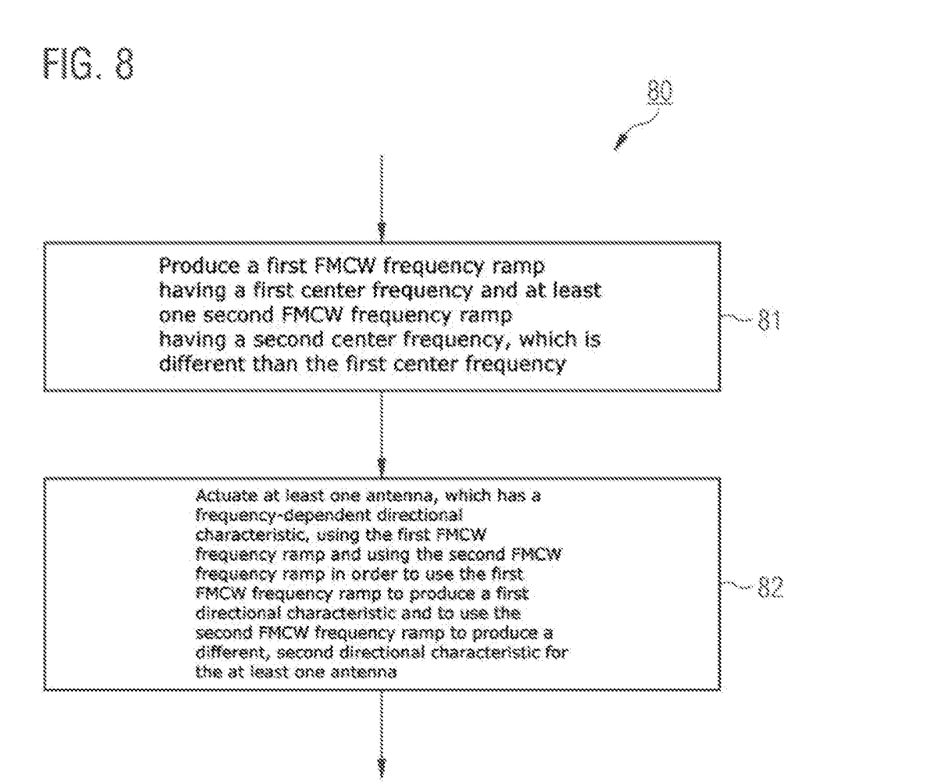
FIG. 8 shows a flowchart for a method according to one exemplary embodiment.

In summary, FIG. 8 shows a method 80 for producing different directional characteristics according to the concept described herein.

The method 80 comprises producing 81 a first FMCW frequency ramp 14 having a first ramp center frequency $f_1$ and at least one second FMCW frequency ramp 15 having a second ramp center frequency $f_2$, which is different than the first ramp center frequency $f_1$. The method 80 further comprises driving 82 at least one antenna 11, which has a frequency-dependent directional characteristic, using the first FMCW frequency ramp 14 and using the second FMCW frequency ramp 15 in order to use the antenna squinting effect to use the first FMCW frequency ramp to produce a first directional characteristic and to use the second FMCW frequency ramp to produce a different, second directional characteristic for the at least one antenna 11.

A first reflection signal can then be received for the first FMCW frequency ramp using a receiving antenna array that comprises a plurality of receiving antenna elements. A second reflection signal for the second FMCW frequency ramp is likewise received using the receiving antenna array. Based on the first and second reflection signals, first and second ranges to objects from which the FMCW frequency ramps have been reflected can then be ascertained.

The aspects and features described together with one or more of the examples and figures described in detail above can also be combined with one or more of the other examples in order to replace an identical feature of the other example or in order to introduce the feature into the other example in addition.

The description and drawings present only the principles of the disclosure. Furthermore, all examples mentioned here are intended to be used expressly only for illustrative purposes, in principle, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

A function block denoted as "Means for . . . " carrying out a specific function can relate to a circuit configured for carrying out a specific function. Consequently, a "means for something" can be implemented as a "means configured for or suitable for something", for example a component or a circuit configured for or suitable for the respective task.

Functions of different elements shown in the figures, including any function blocks denoted as "means", "means for providing a signal", "means for generating a signal", etc., can be implemented in the form of dedicated hardware, e.g. "a signal provider", "a signal processing unit", "a processor", "a controller", etc. and as hardware capable of executing software in conjunction with associated software. When provided by a processor, the functions can be provided by a single dedicated processor, by a single jointly used processor or by a plurality of individual processors, some or all of which can be used jointly. However, the term "processor" or "controller" is far from being limited to hardware capable exclusively of executing software, but rather can encompass digital signal processor hardware (DSP hardware), network processor, application specific integrated circuit (ASIC), field programmable gate array (FPGA), read only memory (ROM) for storing software, random access memory (RAM) and nonvolatile memory apparatus (storage). Other hardware, conventional and/or customized, can also be included.

A block diagram can depict for example a rough circuit diagram that implements the principles of the disclosure. In a similar manner, a flow diagram, a flowchart, a state transition diagram, a pseudo code and the like can represent various processes, operations or steps that are represented for example substantially in a computer-readable medium and are thus performed by a computer or processor, regardless of whether such a computer or processor is explicitly shown. Methods disclosed in the description or in the patent claims can be implemented by a component having a means for performing each of the respective steps of said methods.

It goes without saying that the disclosure of multiple steps, processes, operations or functions disclosed in the description or the claims should not be interpreted as being in the specific order, unless this is explicitly or implicitly indicated otherwise, for example for technical reasons. The disclosure of multiple steps or functions therefore does not limit them to a specific order unless said steps or functions are not interchangeable for technical reasons. Further, in some examples, an individual step, function, process or operation can include multiple partial steps, functions, processes or operations and/or be subdivided into them. Such partial steps can be included and be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be borne in mind that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. A radar apparatus, comprising:
   at least one antenna having a frequency-dependent transmission directional characteristic;
   a transmitter circuit configured to generate a first plurality of frequency-modulated continuous wave (FMCW) frequency ramps having a first center frequency and a second plurality of FMCW frequency ramps having a second center frequency that is different than the first center frequency, to drive the at least one antenna using the first plurality of FMCW frequency ramps to produce a first transmission directional characteristic for the at least one antenna, and to drive the at least one antenna using the second plurality of FMCW frequency ramps to produce a second transmission directional characteristic for the at least one antenna, wherein the second transmission directional characteristic is different from the first transmission directional characteristic; and
   a receiver circuit configured to receive a first plurality of reflection signals corresponding to the first plurality of FMCW frequency ramps and receive a second plurality of reflection signals corresponding to the second plurality of FMCW frequency ramps,
   wherein the receiver circuit is further configured to mix the first plurality of reflection signals with a first local oscillator signal having the first center frequency to generate a first plurality of down-converted signals, mix the second plurality of reflection signals with a second local oscillator signal having the second center frequency to generate a second plurality of down-converted signals, generate a first range Doppler map using the first plurality of down-converted signals, and generate a second range Doppler map using the second plurality of down-converted signals.

2. The radar apparatus as claimed in claim 1, wherein the at least one antenna has a first radiating angle when driven using the first plurality of FMCW frequency ramps and has a second radiating angle when driven using the second plurality of FMCW frequency ramps.

3. The radar apparatus as claimed in claim 1, wherein the at least one antenna is configured for a nominal frequency, and wherein the first center frequency is lower than the nominal frequency and the second center frequency is higher than the nominal frequency.

4. The radar apparatus as claimed in claim 1, wherein the transmitter circuit is configured to drive the at least one antenna using the first plurality of FMCW frequency ramps and the second plurality of FMCW frequency ramps in different time intervals.

5. The radar apparatus as claimed in claim 1, wherein the transmitter circuit is configured to drive the at least one antenna using the first plurality of FMCW frequency ramps as a plurality of successive first FMCW frequency ramps having the first center frequency in a first time interval and to drive the at least one antenna using the second plurality of FMCW frequency ramps as a plurality of successive second FMCW frequency ramps having the second center frequency in a second time interval, which does not overlap the first time interval.

6. The radar apparatus as claimed in claim 1, wherein the frequency-dependent transmission directional characteristic of the at least one antenna is frequency-dependent in an elevation direction.

7. The radar apparatus as claimed in claim 1, comprising an antenna array having a plurality of antennas, including the at least one antenna, wherein the antenna array has the frequency-dependent transmission directional characteristic.

8. The radar apparatus as claimed in claim 7, wherein the transmitter circuit is configured to drive a first antenna of the antenna array using the first plurality of FMCW frequency ramps in a first time interval and drive the first antenna using the second plurality of FMCW frequency ramps in a second time interval, drive a second antenna of the antenna array using the first plurality of FMCW frequency ramps in a third time interval, and drive the second antenna using the second plurality of FMCW frequency ramps in a fourth time interval.

9. The radar apparatus as claimed in claim 1, further comprising:
a receiving antenna array having a plurality of receiving antennas; and
the receiver circuit is configured to vary a reception directional characteristic of the receiving antenna array by adjusting phase offsets between received signals of the plurality of receiving antennas.

10. The radar apparatus as claimed in claim 9, wherein the reception directional characteristic of the receiving antenna array is variable in an azimuth direction.

11. The radar apparatus as claimed in claim 9, wherein the receiver circuit comprises a digital beamforming circuit.

12. The radar apparatus as claimed in claim 10, wherein:
the receiver circuit is configured to vary the reception directional characteristic of the receiving antenna array between a plurality of azimuth directions,
the receiver circuit is further configured to pair each azimuth direction with each transmission directional characteristic to form a plurality of directional characteristic pairs such that each of the plurality of azimuth directions is applied while producing of each of the first transmission directional characteristic and the second transmission directional characteristic, and
the receiver circuit is further configured to generate a different range Doppler map for each of the plurality of directional characteristic pairs.

13. The radar apparatus as claimed in claim 9, wherein the reception directional characteristic is a reception angle of the receiving antenna array to which the receiving antenna array is focused for signal reception.

14. A radar apparatus for a motor vehicle, comprising:
at least one transmitting antenna having a transmission directional characteristic that is frequency-dependent in a first direction;
a transmitter circuit configured to generate a first frequency-modulated continuous wave (FMCW) frequency ramp having a first center frequency and a second FMCW frequency ramp having a second center frequency, which is different than the first center frequency, to drive the at least one transmitting antenna using the first FMCW frequency ramp to produce a first transmission directional characteristic for the at least one transmitting antenna, and to drive the at least one transmitting antenna using the second FMCW frequency ramp to produce a second transmission directional characteristic for the at least one transmitting antenna, wherein the second transmission directional characteristic is different from the first transmission directional characteristic;
a receiving antenna array having a plurality of receiving antennas, wherein a reception directional characteristic of the receiving antenna array is variable in a second direction;
a receiver circuit configured to receive a first plurality of reflection signals corresponding to the first plurality of FMCW frequency ramps and receive a second plurality of reflection signals corresponding to the second plurality of FMCW frequency ramps,
wherein the receiver circuit is further configured to mix the first plurality of reflection signals with a first local oscillator signal having the first center frequency to generate a first plurality of down-converted signals, mix the second plurality of reflection signals with a second local oscillator signal having the second center frequency to generate a second plurality of down-converted signals, generate a first range Doppler map using the first plurality of down-converted signals, and generate a second range Doppler map using the second plurality of down-converted signals; and
a digital beamforming circuit configured to vary the reception directional characteristic of the receiving antenna array by adjusting phase offsets between received signals of the plurality of receiving antennas.

15. The radar apparatus as claimed in claim 14, wherein the at least one transmitting antenna has a first radiating angle in an elevation direction when driven using the first plurality of FMCW frequency ramps and a different, second radiating angle in the elevation direction when driven using the second plurality of FMCW frequency ramps, and wherein the reception directional characteristic of the receiving antenna array is adjustable in an azimuth direction by adjusting the phase offsets between received signals of the plurality of receiving antennas.

16. A method for producing different directional characteristics, comprising:
producing a first frequency-modulated continuous wave (FMCW) frequency ramp having a first center frequency and a second FMCW frequency ramp having a second center frequency, which is different than the first center frequency;
driving at least one antenna, which has a frequency-dependent transmission directional characteristic, using the first FMCW frequency ramp to produce a first transmission directional characteristic for the at least one antenna; and driving the at least one antenna using the second FMCW frequency ramp to produce a second transmission directional characteristic for the at least one antenna, wherein the second transmission directional characteristic is different from the first transmission directional characteristic receiving a first plurality of reflection signals corresponding to the first plurality of FMCW frequency ramps;

receiving a second plurality of reflection signals corresponding to the second plurality of FMCW frequency ramps;

mixing the first plurality of reflection signals with a first local oscillator signal having the first center frequency to generate a first plurality of down-converted signals;

mixing the second plurality of reflection signals with a second local oscillator signal having the second center frequency to generate a second plurality of down-converted signals;

generating a first range Doppler map exclusively using the first plurality of down-converted signal; and generating a second range Doppler map exclusively using the second plurality of down-converted signals.

17. The method as claimed in claim 16, wherein the at least one antenna radiates at a positive radiating angle in relation to a reference radiating angle when driven using the first plurality of FMCW frequency ramps, and wherein the at least one antenna radiates at a negative radiating angle in relation to the reference radiating angle when driven using the second plurality of FMCW frequency ramps.

18. The method as claimed in claim 16, further comprising:

receiving a first reflection signal for the first FMCW frequency ramp using a receiving antenna array that comprises a plurality of receiving antennas;

receiving a second reflection signal for the second FMCW frequency ramp using the receiving antenna array; and ascertaining a first range and a second range to at least one object based on the first reflection signal and the second reflection signal, respectively.

19. The method as claimed in claim 18, further comprising:

varying the reception directional characteristic of the receiving antenna array by adjusting phase offsets between the plurality of receiving antennas.

20. The method as claimed in claim 18, wherein the method further comprises:

producing first digital values, based on receiving of the first plurality of reflection signals;

producing second digital values, based on receiving of the second plurality of reflection signals;

performing a first Fourier transformation based on the first digital values and a second Fourier transformation based on the second digital values; and producing range and speed information based on results of the first Fourier transformation and the second Fourier transformation.

\* \* \* \* \*